United States Patent
Nahles et al.

(10) Patent No.: US 11,551,885 B2
(45) Date of Patent: Jan. 10, 2023

(54) FLEXIBLE CIRCUIT BREAKER

(71) Applicant: PHOENIX CONTACT GMBH & CO. KG, Blomberg (DE)

(72) Inventors: Guido Nahles, Bad Lippspringe (DE); Martin Striewe, Horn-Bad Meinberg (DE); Alexander Fomenko, Bielefeld (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 83 days.

(21) Appl. No.: 17/054,616

(22) PCT Filed: May 29, 2019

(86) PCT No.: PCT/EP2019/063923
§ 371 (c)(1),
(2) Date: Nov. 11, 2020

(87) PCT Pub. No.: WO2019/229110
PCT Pub. Date: Dec. 5, 2019

(65) Prior Publication Data
US 2021/0183592 A1 Jun. 17, 2021

(30) Foreign Application Priority Data

May 29, 2018 (DE) .......................... 102018208439.4

(51) Int. Cl.
*H01H 9/54* (2006.01)
*H02H 3/08* (2006.01)

(52) U.S. Cl.
CPC .............. *H01H 9/542* (2013.01); *H02H 3/08* (2013.01); *H01H 2009/546* (2013.01)

(58) Field of Classification Search
CPC .......... H01H 9/54; H01H 9/541; H01H 9/542; H01H 2009/546; H02H 3/00; H02H 3/006;
(Continued)

(56) References Cited

U.S. PATENT DOCUMENTS 5,170,310 A * 12/1992 Studtmann ............... H02H 1/04
361/65
5,324,989 A 6/1994 Thornton
(Continued)

FOREIGN PATENT DOCUMENTS

DE 29909206 10/2000
DE 102011080270 2/2013
(Continued)

OTHER PUBLICATIONS

Translation of the Written Opinion for International (PCT) Patent Application No. PCT/EP2019/063923, dated Aug. 13, 2019, 4 pages.
(Continued)

*Primary Examiner* — Scott Bauer
(74) *Attorney, Agent, or Firm* — Sheridan Ross P.C.

(57) ABSTRACT

A flexible circuit breaker includes at least two semiconductor switches, at least one input and at least two outputs. Each of the at least two semiconductor switches can carry a defined current, and each of the at least two semiconductor switches is monitored individually in relation to the current flowing therethrough, the first output is assigned to a first semiconductor switch, where by a selection using a selection device on the flexible circuit breaker, one can select whether the current flowing through a second semiconductor switch is assigned to the second output or the first output.

7 Claims, 2 Drawing Sheets

Option 1 Dual-channel mode

(58) Field of Classification Search
CPC ........ H02H 3/08; H03K 17/12; H03K 17/122; H02J 1/14
USPC .......................................................... 307/32
See application file for complete search history.

(56) References Cited

U.S. PATENT DOCUMENTS

| | | | | |
|---|---|---|---|---|
| 5,604,385 | A * | 2/1997 | David | H02J 3/26 307/52 |
| 6,018,203 | A * | 1/2000 | David | H02J 3/14 307/52 |
| 6,816,758 | B2 * | 11/2004 | Maxwell, Jr. | G05B 19/0425 323/241 |
| 9,899,160 | B2 * | 2/2018 | DeBoer | H01H 9/54 |
| 2005/0078024 | A1 | 4/2005 | Harrington | |
| 2010/0096930 | A1 * | 4/2010 | Kuhl | G05F 1/46 307/80 |
| 2010/0109430 | A1 * | 5/2010 | DiSaverio | B60R 16/03 307/10.1 |
| 2019/0215991 | A1 * | 7/2019 | Domurath | H05K 7/20145 |
| 2019/0279829 | A1 * | 9/2019 | Askan | H02H 3/025 |
| 2020/0091710 | A1 * | 3/2020 | Heinemann | H02H 3/08 |

FOREIGN PATENT DOCUMENTS

| | | |
|---|---|---|
| EP | 2645556 | 10/2013 |
| EP | 3024142 | 5/2016 |
| EP | 3046257 | 7/2016 |

OTHER PUBLICATIONS

International Preliminary Report on Patentability for International (PCT) Patent Application No. PCT/EP2019/063923, dated Dec. 1, 2020, 6 pages.
Translation of the International Preliminary Report on Patentability for International (PCT) Patent Application No. PCT/EP2019/063923, dated Dec. 10, 2020, 6 pages.
International Search Report and Written Opinion for International (PCT) Patent Application No. PCT/EP2019/063923, dated Aug. 13, 2019, 8 pages.
Translation of the International Search Report for International (PCT) Patent Application No. PCT/EP2019/063923, dated Aug. 13, 2019, 2 pages.

* cited by examiner

FLEXIBLE CIRCUIT BREAKER

CROSS REFERENCE TO RELATED APPLICATIONS

This application is a national stage application under 35 U.S.C. 371 and claims the benefit of PCT Application No. PCT/EP2019/063923 having an international filing date of 29 May 2019, which designated the United States, which PCT application claimed the benefit of German Patent Application No. 10 2018 208 439.4 filed 29 May 2018, the disclosures of each of which are incorporated herein by reference in their entireties.

BACKGROUND

In many areas of electrical engineering, there is a need for circuit breakers, which protect one or more downstream loads/equipment against excess currents.

A wide variety of circuit breakers were developed for this purpose in the past.

For example, a single-channel circuit breaker for a load having two semiconductor switches is known from DE 20 2016 102 848 U1.

Single and multi-channel electronic equipment circuit breakers are developed and sold by the applicant, for example. One example of a multi-channel electronic equipment circuit breaker is the CBM E4 24DC/0.5-10A-type, for example.

Depending on the intended use, it is necessary here to select and install an equipment circuit breaker to match the desired nominal current.

However, it is often the case that various different equipment circuit breakers are required in larger electrical systems. The production of various equipment circuit breakers is generally expensive. In addition, it is crucial to install the correct equipment circuit breaker during assembly. In particular when a plurality of equipment circuit breakers are utilized, the risk of faulty equipment increases. For one thing, this can result in a system stoppage because the equipment circuit breaker is configured for a nominal current that is too low; for another, it may also result in the system being insufficiently protected so that the protective function is only present to a limited degree or not at all.

Multichannel equipment circuit breakers differ from the single-channel equipment circuit breakers by the fact that multiple independent similar equipment circuit breakers are combined in one device.

OBJECT OF THE INVENTION

It would be desirable to provide users with cost-effective equipment circuit breakers for a plurality of loads.

BRIEF DESCRIPTION OF THE INVENTION

The object is achieved by means of a flexible circuit breaker according to claim 1. Additional advantageous embodiments of the invention are indicated in the dependent claims, the description and the drawings.

BRIEF DESCRIPTION OF THE DRAWINGS

The invention is explained in greater detail below using preferred embodiments with reference to the attached drawing.

DETAILED DESCRIPTION

Figure 1:
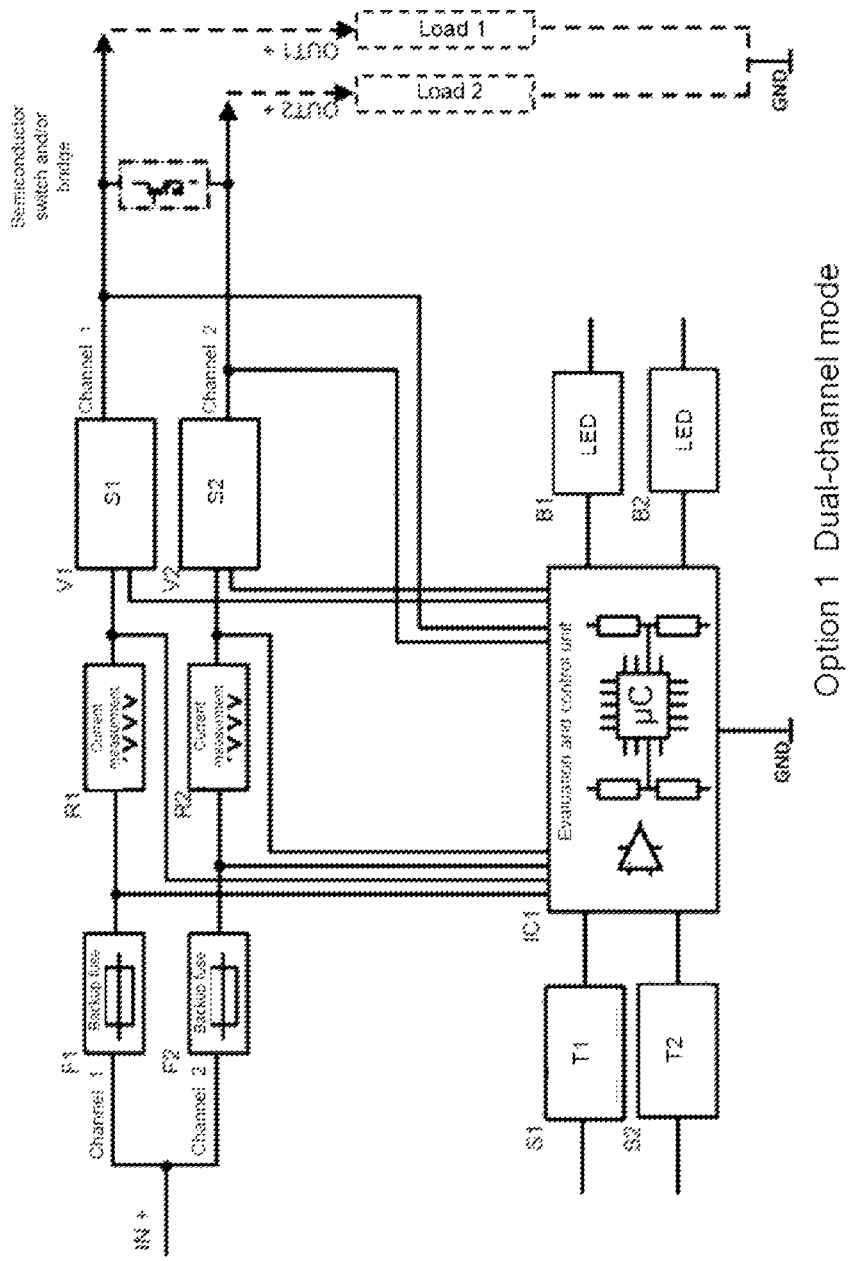
FIG. 1 shows an illustrative circuit breaker according to the invention in accordance with embodiments of the invention in a first configuration.
Figure 2:
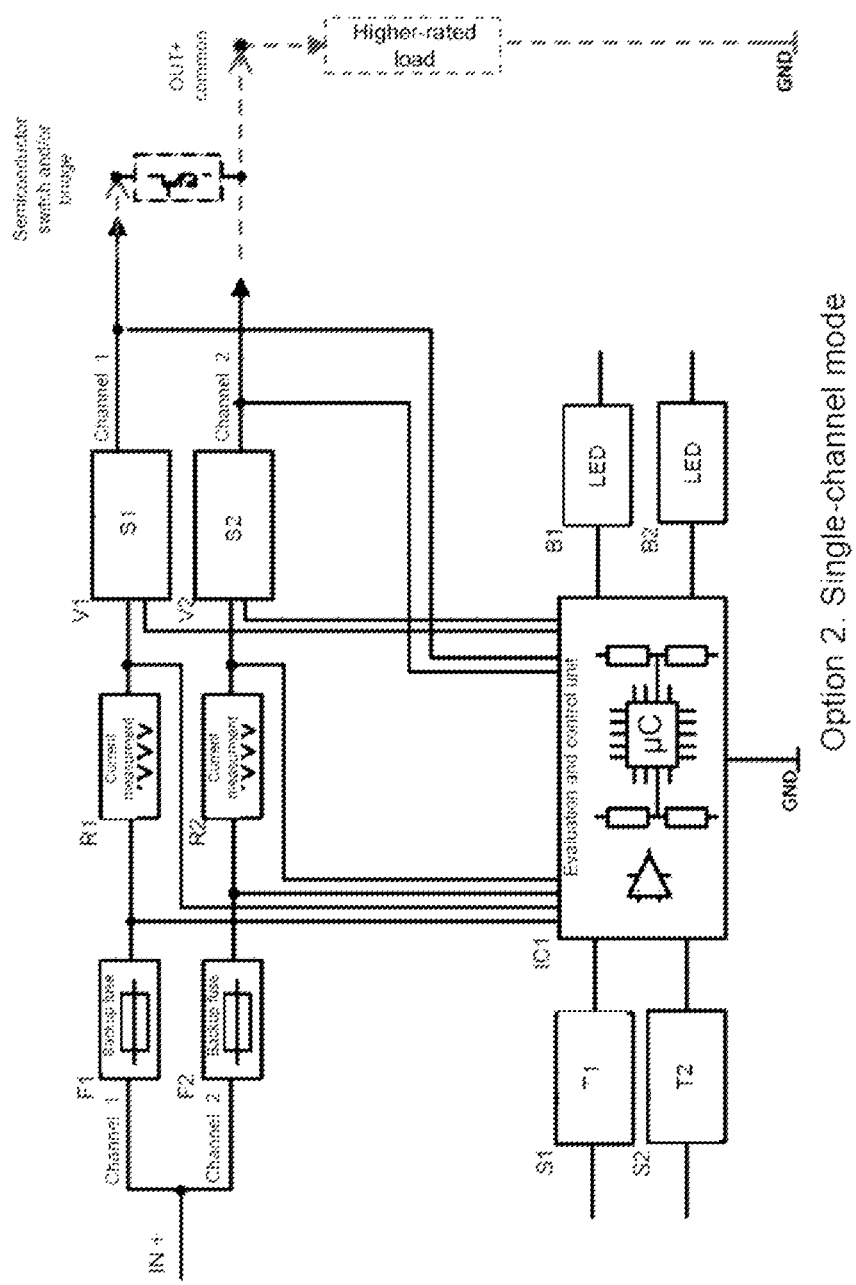
FIG. 2 shows an illustrative circuit breaker according to the invention in accordance with embodiments of the invention in a second configuration.

The invention will be described in greater detail below (with reference to the drawings). It should be noted that various aspects will be described which can be used individually or in combination. This means that any given aspect can be used with various embodiments of the invention unless explicitly represented as a mere alternative.

Also, for simplicity's sake and as a rule, reference will always be made below to only one entity. However, unless noted otherwise, the invention may also have several of any of the entities in question. To that extent, the use of the words "a" and "an" are to be understood only as an indication that at least one entity is being used in a single embodiment.

To the extent that methods are described hereinafter, the individual steps of a method can be arranged and/or combined in any sequence as long as the context does not explicitly provide otherwise. Furthermore, the methods can be combined with one other unless expressly indicated otherwise.

As a rule, specifications having numerical values are not to be understood as exact values, but as having a tolerance of +/−1% to +/−10%.

References to standards or specifications or norms shall be understood as being references to standards or specifications or norms which are or were valid at the time of the application or—if a priority is claimed—at the time of the priority filing. However, this shall not be understood as a general exclusion of applicability to subsequent or superseding standards or specifications or norms.

Hereinafter, "adjacent" explicitly includes a direct proximity relationship without, however, being limited to it, and "between" explicitly includes a position in which the intermediate part is in direct proximity to the surrounding parts.

The invention will be described hereinafter in relation to a dual-channel circuit breaker 1. However, the invention is not limited to two channels, but can also be implemented in the same way using three or more channels. However, for ease of understanding the invention, it will be sufficient to describe the invention only in relation to two channels.

A flexible circuit breaker 1 according to the invention has at least two semiconductor switches S1, S2. Furthermore, the flexible circuit breaker 1 has at least one input IN and at least two outputs OUT1, OUT2.

Each of the at least two semiconductor switches S1, S2 may carry a defined current I1, I2. The semiconductor switches S1 and S2 may be designed similarly or differently. Accordingly, the defined currents I1 and I2 that can be respectively carried by semiconductor switches S1 and S2 may also be identical or different.

Each of the semiconductor switches S1, S2 can now be monitored individually in regard to the current I1, I2 flowing through.

The first output OUT1 is assigned to the first semiconductor switch S1 here. Furthermore, the flexible circuit breaker 1 has a selection device T1. By a selection using the selection device T1, the flexible circuit breaker 1 can be used to select whether the current I2 through a second semiconductor switch S2 is assigned to the second output OUT2 or the first output OUT1.

This means that both channels can be controlled separately in the classic dual-channel operating mode as in FIG. 1, wherein a first channel of the two has its own semiconductor switch S1 and a second channel of the two has its own semiconductor switch S2. In this case, it may also be provided that the voltages provided at the respective channels are different. Likewise, the nominal current provided at the respective channel may be selected to be different.

However, it is also possible by means of the selection device T1 for both "channels" to provide current at a common output to (or parallel at both outputs). This means that when for example both channels are configured for identical currents I, current I can be provided at every output in the first configuration, said outputs each being monitored separately, while in a second configuration double the current, i.e., the current from both channels, is provided at one output. Monitoring can thereby continue to be performed individually for each semiconductor switch.

In other words, the circuit breaker can be flexibly adapted to the respective conditions. This means that the number of protected channels and the appropriate adjustment of the maximum release current inside a circuit breaker module can be adjusted correspondingly.

It will be assumed hereinafter that each of the semiconductor switches S1, S2 and thus every single channel can carry 10 A of current. If the circuit breaker is switched to a single-channel operating mode by means of the selection device T1, 20 A can be provided at one output/in single-channel operating mode. This means that various loads can be protected with one circuit breaker, by means of which the number of variants to be developed can be reduced. As a result, development costs can be reduced. In addition, it is also possible to decrease the production costs for a larger quantity.

In one embodiment of the invention, the semiconductor switches S1, S2 each have at least one MOSFET (metal oxide semiconductor field effect transistor). For alternating current applications, the semiconductor switches S1, S2 each have two MOSFETs. For current intensities of 1 A or more, the MOSFETs are often also referred to as power MOSFETs since they have some structural differences compared to signal transistors.

In one embodiment of the invention, the maximum current I1, I2 can be adjusted separately or jointly by respective semiconductor switches S1, S2. This means that in the case of a dual-channel operating mode, each channel can be adjusted individually. Thus, for example, one channel can be configured for a nominal current of 5 A and another channel can be configured for a nominal current of 10 A. Without limiting generality, in the case of a single-channel operating mode, the adjustable nominal current range can have the range of a single channel as well as the combined nominal current range of two (or more) channels.

Another embodiment of the invention has an initialization phase in which the first output OUT1 and the second output OUT2 are monitored to determine if they are electrically connected to each other, wherein, if an electrical connection was found, the status is signaled on a display element LED. For example, only one output can be actuated and the voltage can be measured only at the second output OUT2. If after current has flowed through the first output OUT1 a voltage other than 0 V is measured at the second output, at which no current flow was enabled through the circuit breaker, one can deduce that the outputs OUT1 and OUT2 are connected to each other electrically. The display element LED may be an optical display such as a light-emitting diode. Alternatively or additionally, other elements, e.g., acoustic elements, may be used for display purposes.

In the event that an electrical connection of the first output OUT1 and the second output OUT2 is detected, it may be optionally provided that a user can choose whether the current I2 through a second semiconductor switch S2 is to be assigned to the second output OUT2 or the first output OUT1. In other words, the user is informed of the fact that the outputs are electrically connected. If this is intentional, the user can decide whether the current of the second semiconductor switch S2 is to be assigned to both outputs, i.e. the first output OUT1 as well, in other words, whether a single-channel operating mode is desired. However, if the electrical connection of the outputs is a malfunction/miswiring, the user can remedy the malfunction/miswiring and decide that the current of the second semiconductor switch S2 is to be assigned only to the second output OUT2, in other words that a multichannel operating mode is desired. It may additionally be provided that, in the case of electrically connected outputs and without the user having to intervene, the nominal current settings of the channels involved are limited to a lower value than the sum of their nominal currents, e.g. the smallest nominal current value, in order to protect downstream appliances against an incorrect configuration/miswiring.

Alternatively or additionally, an initialization phase may be provided in which the first output OUT1 and the second output OUT2 are monitored to determine whether they are electrically connected to each other, wherein, if no electrical connection was found, the status is signaled on a display element LED. The display can indicate the "electrically connected" status by means of an orange light-emitting diode or a light pattern (blinking, etc.), while the "electrically disconnected" status is indicated by a green light diode or an extinguished light diode or a different light pattern (continuous light). No limits are thereby imposed on a person skilled in the art.

Without limiting generality, it may be provided that the selection device T1 has at least one light sensor that can be used to signal a status such as a selected nominal current, the start or end of an initialization phase, an electrical connection of the outputs/single-channel mode/two-channel mode, excess current condition, and so on, by means of light sequences and/or light colors.

It shall be noted that the flexible circuit breaker 1 may also be operated in parallel with another similar flexible circuit breaker 1 of the same type. One of the flexible circuit breakers 1 can be configured as the master and can act as such, while for example the other flexible circuit breaker 1 is configured as the slave and as such takes over if the master fails. Both flexible circuit breakers 1 may be operated in the "single-channel" mode as well as in the "multichannel" mode. Without limiting generality, it may be provided that, for example, the flexible circuit breakers 1 have an interface for communication purposes. By means of this interface, flexible circuit breakers 1 in a master-slave arrangement can exchange data regarding operation/status. However, it is also possible, e.g., for configuration data, e.g., nominal current, single-/multi-channel operating mode, and so on, to be configured via the interface and/or operating data/measurement data to be read from the flexible circuit breaker 1. A suitable interface may be provided in both a wired manner (electrical/optical) as well as in a wireless manner (e.g., WLAN, ZigBee, Bluetooth Low-Energy, RFID, NFC, free-space optical communications, etc.).

Alternatively or additionally, the function as master/slave can be configured by an already-present selection device T1 or a separate selection device T2.

For example, by means of a certain pressing duration/pressing sequence, a programming mode may be activated in which this function and/or a nominal current (per channel/all channels) and/or a single-channel operating mode is available for selection.

For example, the flexible circuit breaker may have a microcontroller µC. One or more pushbuttons T1, T2 (e.g., per channel) may be provided for user operation purposes. A multicolored light-emitting diode LED, e.g., B1, B2, may be provided for display and signaling purposes.

While operating in the dual-channel mode, each channel can be operated with the associated pushbutton T1, T2, e.g., on, off, current setting, etc. The respective display LED can signal the status of the associated channel. In other words, B1 can be assigned to channel 1/output OUT1, and B2 can be assigned to channel 2/OUT2.

While operating in the single-channel mode, the operation of each of the two pushbuttons T1, T2 may be equally possible. The display LED of the two halves can then occur synchronously. Naturally, it may also be provided as an alternative that only one of the two pushbuttons and only one of the assigned LED displays are used while the others are inoperable for the normal operating mode.

Multiple steps may be provided to switch from the multichannel operating mode to the single-channel operating mode.

For example, it may be provided that in a first step, the relevant channels OUT1, OUT2 are switched off. Then, the relevant channels OUT1, OUT2 can be connected to each other, wherein the connection is possible on the output side of the flexible circuit breaker 1 ("hardwired") as well as by switching an optionally provided switching matrix in the flexible circuit breaker 1. In an additional step, the channels OUT1, OUT2 in question are now placed in the initialization phase mode by simultaneous activation (pressing the selection device T1, T2). In the initialization phase, the function of channel-specific queries, e.g., a self-test of the corresponding semiconductor switch S1, S2, can be performed, for example. In addition, the presence of an electrical connection can be verified.

For example, the semiconductor switches S1, S2 can be briefly (e.g., 5 ms) switched on. If for example both semiconductor switches S1, S2 are off, there should not be any voltage at the corresponding outputs OUT1, OUT2, so that the semiconductor switches S1, S2 should be functional. If one of the semiconductor switches S1, S2 is turned on, while the other remains off, there should be a voltage only at the output that is assigned to the semiconductor switch that is switched on. This means that the corresponding channel is in single operating mode. A common operating mode by means of an electrical connection is provided only for the semiconductor switches S1, S2 for which there is voltage at more than one output. As already described earlier, now the user can be signaled that at least two outputs are electrically connected to each other. For example, if the selection devices of the relevant channels are re-actuated together, this can be considered to be confirmation of a single-channel operating mode.

On the other hand, switching to the multichannel mode can be enabled by a type of "reset" function. Here, the user can end the single-channel mode by pressing one/multiple/all selection devices T1, T2 over a longer period, e.g., 3 s. The flexible circuit breaker 1 can thereby be placed simultaneously in a switched-off state.

Without limiting generality, it may also be provided that if the voltage at the outputs and/or the current at the outputs is different, the flexible circuit breaker 1 detects the loss of an external electrical connection and switches the affected channels into the multi-channel operating mode (given a reduced nominal current under certain conditions) as a precautionary measure.

In addition, it may further be provided that each semiconductor switch S1, S2 is assigned a resistor R1, R2 for measuring the current through the respective semiconductor switch S1, S2 if the inherent resistance of the semiconductor switches is too low to allow a reasonable measurement at the semiconductor switch. Likewise, it may be further provided that the semiconductor switches S1, S2 are protected by a common fuse and/or one fuse F1, F2 per semiconductor switch S1, S2 so that in the event of an overcurrent/malfunction, the fuse F1/F2 is triggered and protects the flexible circuit breaker 1 as well as the downstream equipment from being destroyed.

LIST OF REFERENCE SIGNS

1 Flexible circuit breaker
S1, S2 Semiconductor switch
OUT1, OUT2 Output
I1, I2 Current
T1, T2 Selection device
LED Display element
F1, F2 Fuse
R1, R2 Resistor

What is claimed is:

1. A flexible circuit breaker, comprising:
   at least two semiconductor switches including a first semiconductor switch and a second semiconductor switch;
   at least one input;
   at least two outputs including a first output and a second output; and
   at least one selection device, wherein each of the at least two semiconductor switches is configured to carry a defined current, wherein each of the at least two semiconductor switches is monitored individually in relation to the current flowing therethrough, wherein the first output is assigned to the first semiconductor switch, wherein by a selection using the at least one selection device, one selects whether the current flowing through the second semiconductor switch is assigned to the second output or the first output, wherein in an initialization phase, the first output and the second output are monitored to determine whether the first output and the second output are electrically connected to each other, and if an electrical connection is found, a status is signaled on at least one display element that the electrical connection exists.

2. The flexible circuit breaker according to claim 1, wherein if the electrical connection of the first output and the second output is detected, a user is allowed to select whether the current through the second semiconductor switch is to be assigned to the second output or the first output.

3. The flexible circuit breaker according to claim 1, wherein if no electrical connection is found during the initialization phase, a status is signaled on the at least one display element that the electrical connection does not exist.

4. The flexible circuit breaker according to claim 1, wherein the at least one selection device includes at least one light device, wherein statuses are signaled by light sequences and/or light colors.

5. The flexible circuit breaker according to claim 1, wherein if a second flexible circuit breaker is operated in parallel, one of the flexible circuit breakers acts as the master and the other flexible circuit breaker acts as the slave.

6. The flexible circuit breaker according to claim 5, wherein the flexible circuit breakers have an interface for communication purposes.

7. The flexible circuit breaker according to claim 5, wherein the flexible circuit breakers are configurable as master or slave by means of the at least one selection device.

* * * * *